United States Patent [19]
Crisp

[11] Patent Number: 6,003,920
[45] Date of Patent: Dec. 21, 1999

[54] CARGO-SPACE COVER FOR MOTOR VEHICLE

[75] Inventor: Terence Sam Crisp, Keerbergen, Belgium

[73] Assignee: Peter Butz GmbH & Co., Langenfeld, Germany

[21] Appl. No.: 09/098,301

[22] Filed: Jun. 16, 1998

[30]     Foreign Application Priority Data

Jun. 17, 1997  [DE]  Germany ........................... 197 25 410
Jun. 8, 1998   [DE]  Germany ........................... 198 25 353

[51] Int. Cl.⁶ ..................................................... B60R 5/00
[52] U.S. Cl. ........................ 296/37.1; 296/37.8; 160/265; 160/310
[58] Field of Search .................................. 296/37.1, 37.8, 296/37.16, 98; 160/23.1, 265, 310

[56]                References Cited

U.S. PATENT DOCUMENTS

| | | | |
|---|---|---|---|
| 4,854,632 | 8/1989 | Kreuze et al. ...................... | 296/37.3 X |
| 5,354,113 | 10/1994 | Pettersson ................................. | 296/98 |
| 5,372,173 | 12/1994 | Horner ................................. | 160/310 X |
| 5,630,460 | 5/1997 | Yuan ........................................ | 160/310 |

FOREIGN PATENT DOCUMENTS

| | | |
|---|---|---|
| 0 368 405 | 5/1990 | European Pat. Off. . |
| 2209001 | 9/1973 | Germany . |
| 91 02 196 | 6/1991 | Germany . |
| 40 16 707 | 11/1991 | Germany . |

*Primary Examiner*—D. Glenn Dayoan
*Assistant Examiner*—Patricia Engle
*Attorney, Agent, or Firm*—Herbert Dubno; Andrew Wilford

[57]                    ABSTRACT

A cover for a motor-vehicle storage space has a winder fixed at an inner end of the space and a cover sheet secured in the winder, having an outer edge, and displaceable between a position wound up at the winder and a position extending from the winder above the space with its free edge at an opposite outer end of the space. A pair of like spaced apart guides flank the space and each extend from the inner end to the outer end. Respective entrainment elements are displaceable along the guides between the inner and outer ends and are each connected to the outer edge. Respective drive motors are connected to the entrainment elements for displacing the entrainment elements outward from the inner end to the outer end and inward from the outer end to the inner end. At least one of the motors is of variable speed. Respective speed sensors associated with the drives produce outputs corresponding to the displacement speeds of the respective entrainment elements and a controller connected to the sensors and to the one variable-speed motor compares the outputs of the sensors and varies an output speed of the one variable-speed motor so the entrainment elements move synchronously.

9 Claims, 1 Drawing Sheet

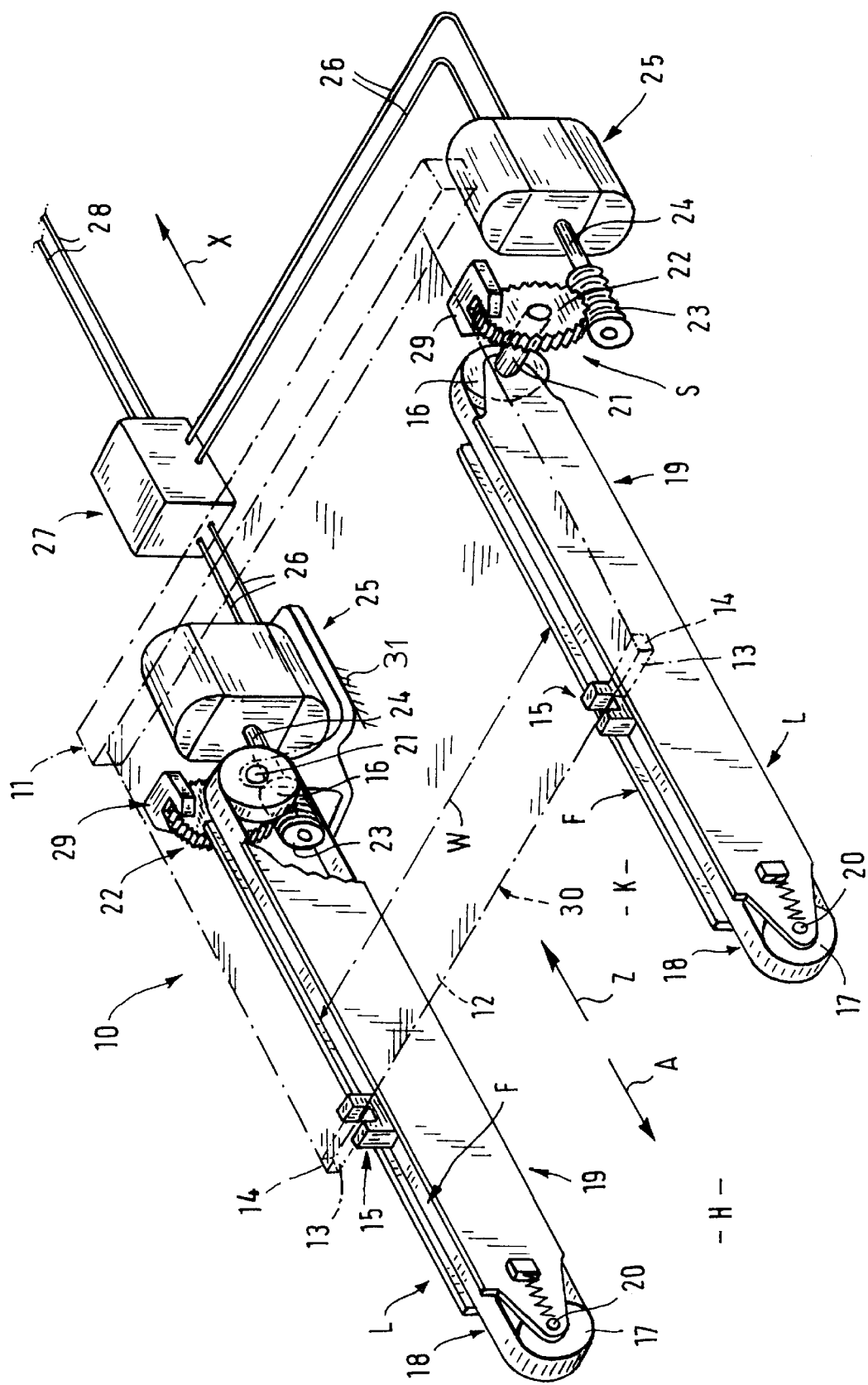

6,003,920

CARGO-SPACE COVER FOR MOTOR VEHICLE

FIELD OF THE INVENTION

The present invention relates to a cover for the cargo-space of a motor vehicle. More particularly this invention concerns such a cover that is advanced and retracted by a motor to cover the cargo held in such a cargo space, normally behind the passenger seats.

BACKGROUND OF THE INVENTION

It is normally considered desirable for the sake of appearance or security to provide a cover that can move into position above the cargo space of a motor vehicle, for instance over the wayback of a station wagon or utility vehicle, to conceal and confine any objects therein. Such a cover comprises at the least a winder that is positioned at an inner end of the space, normally against the seat backs defining the front wall of the space, and a cover sheet that can be wholly wound up in the winder or extended therefrom so its outer edge is at the outer end of the space, normally just short of a rear hatch or door.

In a typical powered system described in German patent document 4,016,707 the cover assembly is basically U-shaped with a pair of guide arms that flank the space and that each carry a respective entrainment element movable in and out along a respective side of the space. The outer edge of the cover sheet has a rod with ends fixed to the entrainment elements and the guides are provided with flexible drive elements that extend back to a common motor mounted in the base of the unit that joins the inner ends of the two guides.

Such an arrangement has several disadvantages. First of all if the rear seats are folded down or removed to increase the cargo area, the elements joining the inner ends of the guides extend across this space and greatly reduces its usability. In addition the unit cannot readily be adapted for use in different vehicles as the width and length of the cargo space can vary considerably and it is impossible to make the system variable in width and length to the same extent.

A sun roof is known from European 0,368,405 where the glass panel is moved by a pair of flanking motors interconnected by a flexible shaft. Such a system bears little resemblance to a cargo-space cover and the flexible shaft interconnecting the two separate drive motors constitutes just the same type of structure that makes the above-described cargo-space cover so disadvantageous.

Similarly German utility model 9,102,196 describes a system for operating curtains, security grates, and the like which uses a spring-loaded winder and wherein the outer edge of the sheet or grid being wound in and out has a rod whose ends are each displaced by a respective cable operated by a respective motor. The tensions in the cables are monitored and the motors are operated to keep the two tensions substantially equal so as to synchronize movement of the ends of the rod. Such a system is capable of jamming and is also hardly applicable to a cover sheet for a cargo space.

OBJECTS OF THE INVENTION

It is therefore an object of the present invention to provide an improved cover for a motor-vehicle cargo space.

Another object is the provision of such an improved cover for a motor-vehicle cargo space which overcomes the above-given disadvantages, that is which does not interfere with expansion of the cargo space, that is sure and reliable in operation, and that can be fitted relatively easily to virtually an cargo space, regardless of size.

SUMMARY OF THE INVENTION

A cover for a motor-vehicle storage space has a winder fixed at an inner end of the space and a cover sheet secured in the winder, having an outer edge, and displaceable between a position wound up at the winder and a position extending from the winder above the space with its free edge at an opposite outer end of the space. According to the invention a pair of like spaced apart guides flank the space and each extend from the inner end to the outer end. Respective entrainment elements are displaceable along the guides between the inner and outer ends and are each connected to the outer edge. Respective drives including respective drive motors are connected to the entrainment elements for displacing the entrainment elements outward from the inner end to the outer end and inward from the outer end to the inner end. At least one of the motors is of variable speed. Respective speed sensors associated with the drives produce outputs corresponding to the displacement speeds of the respective entrainment elements and a controller connected to the sensors and to the one variable-speed motor compares the outputs of the sensors and varies an output speed of the one variable-speed motor so the entrainment elements move synchronously.

Thus all that connects the two sides of the drive for the cover is the control lines. Normally according to the invention both drive motors are of variable speed and the controller varies the output speeds of both of the drive motors. Furthermore the controller includes a processing unit and flexible conductors extending between the processing unit, the motors, and the sensors so that the unit can be mounted remotely from the guides and motors.

With this system therefore the two guides with their respective motors can be mounted on opposite sides of a storage compartment of any reasonable width, and it is not difficult to make the length of the guides adjustable to accommodate a cargo space of any reasonable size. Since the guides are not attached to each other, there is no rigid structure interconnecting the two sides so that if the cover sheet with its winder are lifted out, the entire cargo space is clear and can even be opened up inward, that is forward into the rear passenger compartment without encumbrance.

The motors can be fluid-powered, in which case the control lines are flexible hoses or tubes, or electrical, in which case the control lines are flexible wires that also can be routed out of the way. The drives according to the invention can each include a nut carrying the entrainment element and carried on a threaded spindle driven by the motor or can be an endless conveyor element having a stretch extending along the guide and a gear drive connected between the respective motor and the respective element.

BRIEF DESCRIPTION OF THE DRAWING

The above and other objects, features, and advantages will become more readily apparent from the following description, reference being made to the accompanying drawing whose sole figure is a mainly diagrammatic and perspective view of the system of this invention.

SPECIFIC DESCRIPTION

As seen in the drawing, a motor vehicle indicated schematically at 31 forms an upwardly open cargo compartment K extending in a normal travel direction Z and having a rear portion H closed by an unillustrated rear hatch or door. A winder 11 is provided at the front end of the space K and a cover sheet 12 also shown in dashed lines extends rearward from the winder 11 and has an outer edge 30 provided with a rod 13 having projecting outer ends 14. The winder 11 is standard and has a spring-loaded shaft about which the cover sheet 12 is wound so that, when not tensioned, it is wound up inside the elongated housing of the winder 11 which itself is normally releasably mounted just behind the backs of the unillustrated rear seats.

Flanking this cargo space K are two linear drives L each comprising a housing 19 extending in the direction Z and having a rear end provided with a pivot 20 for an idler wheel 17 and a front end journaling a shaft 21 carrying a drive wheel 16.

A belt 18 is spanned over the wheels 16 and 17 and has an upper reach riding in a guide F extending in the direction Z. A U20 shaped entrainment block or element 15 in which the respective end 14 of the rod 13 is retained rides along each of the guides F and is connected to the upper stretch of the respective belt 18.

Each linear drive L has a respective drive assembly S comprised of a motor 25 having an output shaft 24 carrying a worm gear 23 meshing with a pinion 22 carried on the respective shaft 21. Each gear 22 is provided with a respective sensor 29 that detects movement of this gear 22 and thereby determines the position of the respective entrainment block 15 along the guide F. The motors 25 are of the variable-speed reversible type and are connected along with the sensors 29 via flexible electrical lines 26 with a controller 27 that can, therefore, be mounted anywhere convenient in the vehicle 31 and that is in turn connected via control lines 28 to an unillustrated two-position switch that operates the system.

To cover any objects in the space K, both motors 25 are energized to rotate the respective gears 22 in a direction to move the entrainment blocks 15 outward in a direction A opposite the travel direction Z. If one of the sensors 29 detects that the respective gear 22 is moving too fast or too slow, the controller 27 speeds up or slows down one or the other drives so that they both move the blocks 15 synchronously. This is done by the simple expedient of comparing the frequency of the pulses emitted by the one sensor 29 with those emitted by the other and then adjusting the speed of one or both of the motors so that both pulse streams are at the same frequency. For retracting the cover sheet 12 forward in the direction Z the motors 25 are reversed, but are once again operated synchronously by means of the sensors 29 and controller 27.

I claim:

1. In a motor vehicle having a storage space, a cover comprising:

a winder fixed at an inner end of the space;

a cover sheet secured in the winder, having an outer edge, and displaceable between a position wound up at the winder and a position extending from the winder above the space with its free edge at an opposite outer end of the space;

a pair of like spaced apart guides flanking the space and each extending from the inner end to the outer end;

respective entrainment elements displaceable along the guides between the inner and outer ends and each connected to the cover-sheet outer edge;

respective drive means including respective drive motors connected to the entrainment elements for displacing the entrainment elements outward from the inner end to the outer end and inward from the outer end to the inner end, at least one of the motors being of variable speed;

respective speed sensors associated with the drive means for producing outputs corresponding to the displacement speeds of the respective entrainment elements; and control means connected to the sensors and to the one variable-speed motor for comparing the outputs of the sensors and varying an output speed of the one variable-speed motor so the entrainment elements move synchronously.

2. The motor-vehicle storage-space cover defined in claim 1 wherein both drive motors are of variable speed.

3. The motor-vehicle storage-space cover defined in claim 2 wherein the control means varies the output speeds of both of the drive motors.

4. The motor-vehicle storage-space cover defined in claim 1 wherein the control means includes a processing unit, and flexible conductors extending between the processing unit, the motors, and the sensors, whereby the unit can be mounted remotely from the guides and motors.

5. The motor-vehicle storage-space cover defined in claim 1 wherein the guides are not attached to each other.

6. The motor-vehicle storage-space cover defined in claim 1 wherein the motors are fluid-powered.

7. The motor-vehicle storage-space cover defined in claim 1 wherein the motors are electrical.

8. The motor-vehicle storage-space cover defined in claim 1 wherein each drive means includes an endless conveyor element having a stretch extending along the guide, and a gear drive connected between the respective motor and the respective conveyor element.

9. The motor-vehicle storage-space cover defined in claim 1 wherein the cover-sheet outer edge is provided with a stiffening rod having ends releasably secured in the entrainment elements.

* * * * *